United States Patent [19]

Dameron

[11] Patent Number: 4,689,855
[45] Date of Patent: Sep. 1, 1987

[54] POULTRY LINE DIVIDER

[75] Inventor: Woodal W. Dameron, Marietta, Ga.

[73] Assignee: Cantrell Machine Co.

[21] Appl. No.: 824,122

[22] Filed: Jan. 30, 1986

[51] Int. Cl.$^4$ ............................................ A22C 21/00
[52] U.S. Cl. .......................................... 17/11; 17/24; 198/440; 198/680
[58] Field of Search ...................... 17/24, 11; 198/680, 198/440

[56] References Cited

U.S. PATENT DOCUMENTS

| | | | |
|---|---|---|---|
| 2,652,589 | 9/1953 | Spooner | 17/24 |
| 3,766,602 | 10/1973 | Bottomley et al. | 17/24 X |
| 3,811,555 | 5/1974 | Scheier et al. | 198/680 X |
| 4,282,633 | 8/1981 | Graham et al. | 198/680 |
| 4,283,813 | 8/1981 | House | 17/45 |
| 4,423,808 | 1/1984 | Venturelli | 198/477 |
| 4,475,462 | 10/1984 | Tsumaki et al. | 105/149 |
| 4,498,578 | 2/1985 | Altenpohl | 198/680 |

*Primary Examiner*—Willie G. Abercrombie
*Attorney, Agent, or Firm*—Dority & Manning

[57] ABSTRACT

A poultry line divider has a rotatable wand constructed so as to engage and move a selected sequence of shackles to one side of a line divider guide while permitting the other shackles to pass unengaged onto the other side of the line divider guide.

11 Claims, 5 Drawing Figures

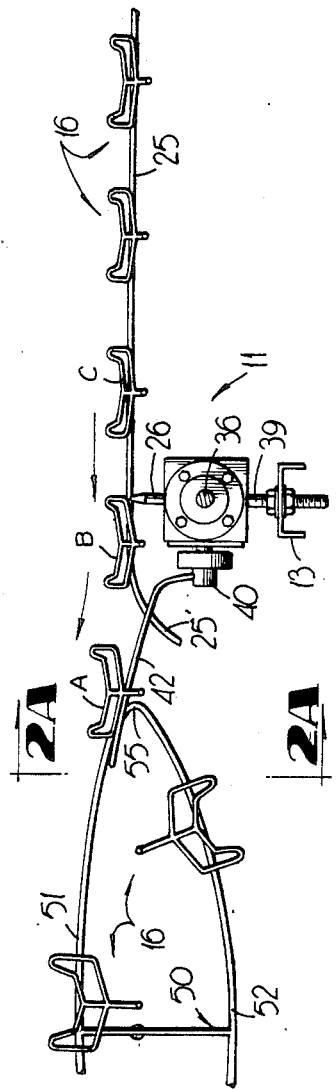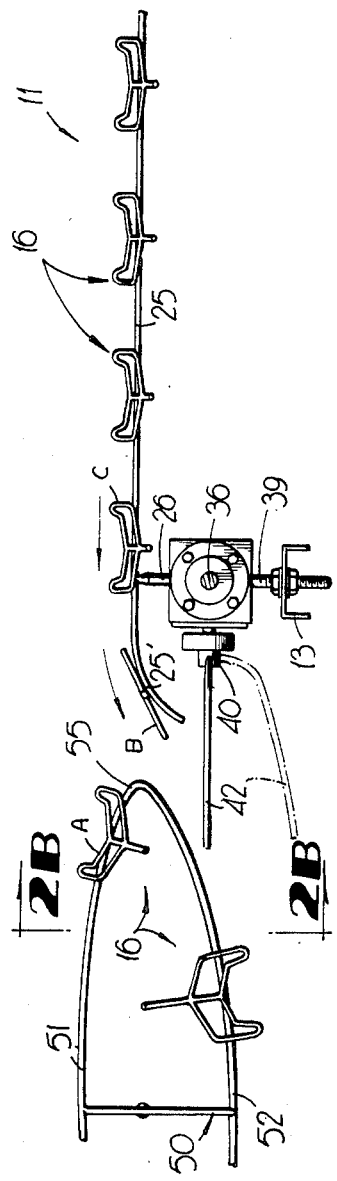

POULTRY LINE DIVIDER

TECHNICAL FIELD

This invention relates to apparatuses for dividing a line of poultry being conveyed in a poultry processing plant.

BACKGROUND OF THE INVENTION

In poultry processing plants where birds such as chickens are killed, defeathered, eviscerated and otherwise prepared for markets, the birds are normally suspended in a head-down attitude on an overhead endless conveyor line and conveyed serially through various processing stations. An important processing step is that of eviscerating the birds wherein the vent of each bird is opened and the viscera partially extracted so as to lay over the outer surface of the bird. It is a common practice to inspect each bird after it has been eviscerated and while the viscera is still hanging from the bird so that the inspector may determine the condition of the viscera before it is separated and removed from the bird. In this manner a diseased bird can be identified from an inspection of its viscera and removed from the processing line.

Poultry processing plants today have the capacity for running poultry processing lines at faster rates than inspectors can function. Therefore, it has become a practice to divide the poultry processing line at an inspection station so that only one out of each consecutive two or more birds is presented to the inspector thereby giving the inspector sufficient time to perform his inspection. Various schemes are employed to insure that the birds that pass the inspector at the station are later presented for inspection at either the same or another station.

The mechanisms used to divide poultry processing lines in the manner just described are referred to as line dividers. As exemplified by that shown in U.S. Pat. No. 4,282,633, the line dividers have typically been comprised of a set of paddles or the like mounted to an endless conveyor driven by a power takeout mechanism coupled with the poultry line conveyor itself. The paddles are mounted to the auxillary conveyor at spacings such that they are caused to move into the path of travel of the shackles from which the birds are suspended so as to engage selected ones in a sequence of the shackles such as, for example, every other one. A helical displacement element is also shown in this patent whose pitch is equal to the spacing between alternate shackles so that upon rotation it engages and deflects every other shackle.

Though line dividers of the type just described have performed satisfactorily they have not been versatile. By this is meant that once established on a poultry processing line the dividing sequence may not be readily altered. Thus, once coupled with the line at an inspection station the line divider acts in one sequence only, i.e., it may divide out one out of every consecutive two shackles for inspection. If another sequence is desired, such as where the processing line speed is advanced, another line divider mechanism would have to be substituted, for example a mechanism having a different spacing between paddles. In addition, line dividers of the type described have been relatively large and bulky and thus inherently costly to manufacture and to maintain. It therefore is a general object of the present invention to provide a line divider which overcomes the limitations described.

SUMMARY OF THE INVENTION

Briefly described the present invention comprises apparatus for dividing a line of poultry being conveyed suspended from shackles by endless conveyor means, including rotary drive means adapted to be coupled with the endless conveyor means. A deflector bar is mounted to the rotary drive means for movement along a path of travel that intersects the path of shackle movement in timed relation with the shackle movement so as repeatedly to engage and move one out of a selected multiple number of successive shackles laterally of the path of shackle movement. Thus, it is an object of this invention to provide a poultry conveyor line divider which functions reliably to separate one bird from a series of birds for visual inspection, with the apparatus having the capability to separate alternate ones or one of three or one of four birds by the substitution of a sprocket of the drive system, without requiring a change of the element that engages the poultry shackle.

The apparatus can be conveniently modified to separate one bird from a series of two, three or more birds, so as to be compatible with the speed of the conveyor line.

In another form of the invention, apparatus for dividing a line of poultry being conveyed along a linear path of travel suspended from a set of shackles comprises a wedge shaped divider guide mounted within the path of shackle travel so as to guide the shackles to one side of the path of travel along one side of the divider guide. A deflector bar is mounted for rotary movement in timed relation to the movement of the shackles so as to intersect the path of shackle movement and deflect selected shackles of the set of shackles to the other side of the path of travel along the other side of the divider guide.

Another object of this invention is to provide a poultry line divider that is reliable in its operation and which can be expediently modified to separate one, two or more birds from a series of birds moving on an overhead conveying system for visual inspection.

Other objects, features and advantages of the invention will become apparent upon reading the following specification, when taken in conjunction with the accompanying drawings.

BRIEF DESCRIPTION OF THE DRAWINGS

FIG. 2A is an end elevational view of the apparatus illustrated in FIG. 1 showing a deflector bar deflecting a shackle out of the path of shackle movement to one side of a divider guide, while

FIG. 3A is a plan view of the apparatus in the position shown in FIG. 2A taken along plane 3A—3A, while FIG. 3B is a plan view of the apparatus as depicted in FIG. 2B taken along plane 3B—3B.

DETAILED DESCRIPTION

Figure 1:
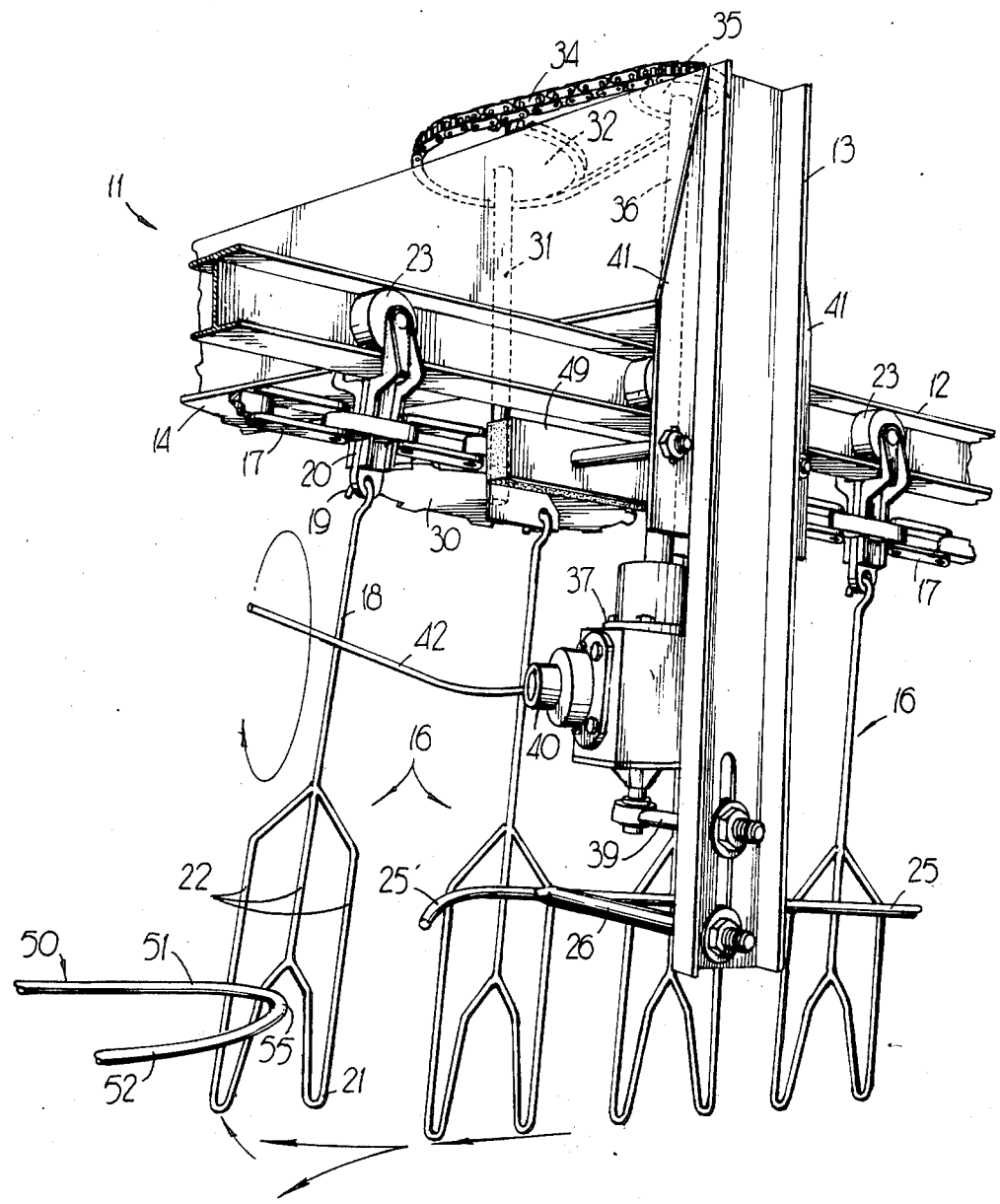
FIG. 1 is a perspective view of a line divider embodying principles of the invention shown coupled with a poultry line conveyor.

With reference next to the drawings, there is shown a line dividing portion of a poultry processing line indicated generally at 11 and which comprises a rail 12 in the form of an I-beam. The rail 12 is mounted to a frame that includes an upright beam 13 and a cross beam 14. A set of shackles, indicated generally at 16, is driven linearly here along the processing line beneath the rail 12 by an endless drive chain 17. Each shackle is of conventional construction and is seen to have an upper stem 18 provided with a hook 19 at its upper end which is hooked to a hanger 20 incorporated into the drive chain 17. Each shackle also is seen to have lower hock supporting, U-shaped members 21 that merge with three intermediately located bars 22. The hangers 20 are supported for movement along the rail 12 by means of pairs of rollers 23 rotatably positioned upon the rail.

At the line dividing portion of the processing line the hangers 20 are slidably supported upon a guide bar 25 that is mounted to a lower portion of the upright beam 13 by means of a lateral support member 26. The position of the guide bar 25 with respect to the rail 12 is such as to orient the shackles at a slight angle with respect to vertical, as most clearly shown in FIG. 2A. The guide bar 25 is seen to terminate with an acurate end portion 25' located at a position just beyond or downstream from the upright beam 13.

A power takeoff unit is provided which comprises a drive sprocket 30 mounted to the bottom of a drive shaft 31 with teeth in engagement with the endless drive chain 17. The drive shaft 31 passes through two bearing blocks 33 to an upper sprocket 32 to which another endless drive chain 34 is coupled. The drive chain 34 is in engagement with another sprocket 35 from which a drive shaft 36 depends through two other bearing blocks 38 to a gear box 37 that is supported by another lateral support member 39 upon a lower portion of the beam 13. The gear box 37 has an output drive shaft 40 to which is mounted an arcuate wand or deflector bar 42 which acts as a rotatable camming device. The shape, length, and orientation of the deflector bar 42, and the gear ratio of the gear box, are all established so that with each revolution of the deflector bar the bar contacts and laterally urges one out of a selected number of successive shackles laterally to the left, as viewed in FIGS. 1-3. For example, the gearing of the gear box may be such as to cause the deflector bar or wand to engage the stem 18 of every second consecutive shackle or every third consecutive shackle. Thus, by a mere change of a gear within the gear box, the line divider may be caused to act upon different sequences of shackles such as to urge to one side every second, third, or fourth shackle, and so on.

Finally, the apparatus is seen to have a wedge-shaped divider bar or guide 50 mounted beneath rail 12 at the height of the U-shaped hock supporting bars 21 of the shackles. The orientation of the apex 55 of the guide 50 is located with respect to the path of shackle travel so that a shackle engaged and cammed laterally by the deflector bar 42 will slide upon the outer leg 51 while those shackles that are not cammed and moved laterally by the wand engage the inner leg 52 adjacent the apex 55 and then slide upon that leg. It will be appreciated that government or commercial inspectors may be stationed beside either or both of the outer and inner legs of the guide for inspection of birds suspended from the shackles.

Figure 2A:
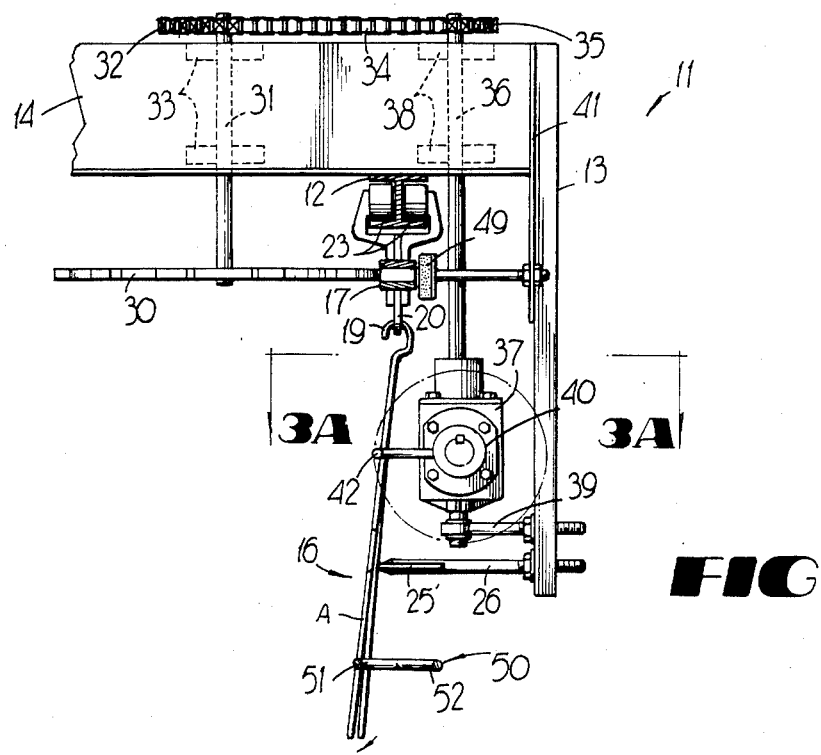
Figure 2B:
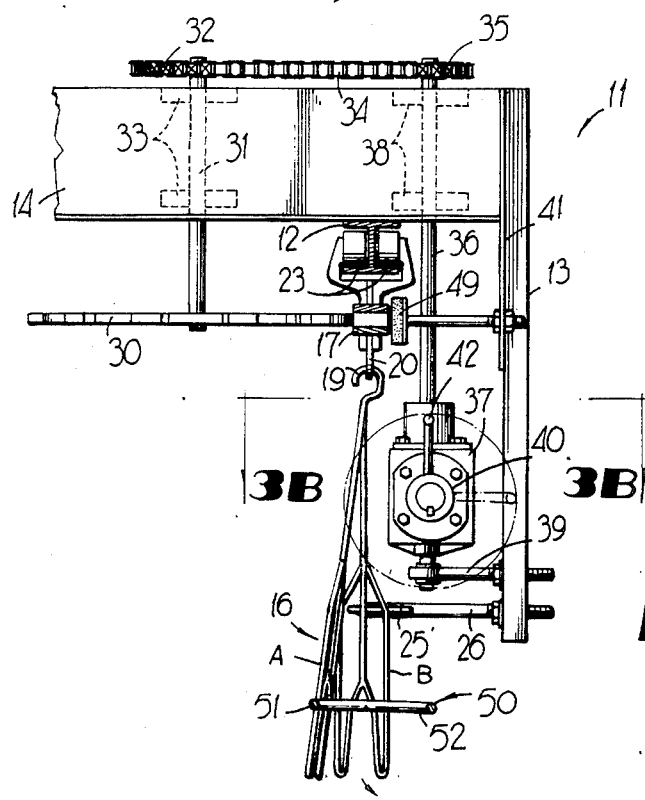
FIG. 2B is another end view with the apparatus showing a deflector bar not deflecting a shackle and thus permitting that shackle to pass to the other side of the divider guide.

In operation, the drive chain 17 moves the shackles 16 serially through the line divider in the direction of the arrows shown at their bottoms in FIGS. 1-2 with the shackle bars 22 sliding along guide bar 25. In conjunction with their movements the deflector bar or wand 42 is rotated clockwise, as viewed in FIGS. 1-2 by the gear box unit of the power takeoff mechanism so as to trace a parabolic-like path about an axis oriented parallel with that of shackle movement beneath rail 12. In FIGS. 2A and 3A it is seen that a shackle A has been contacted by the revolving wand as it leaves bar 25 and urged laterally into sliding contact with the outer leg 51 of the divider guide bar 50 just downstream of apex 55. In FIGS. 2B and 3B the shackle A is now being moved along the outer leg 51 and the wand 42 has now broken contact with it and moved in its orbit to a position to one side of the path of movement of the shackles. Thus, as the wand continues to move towards the position shown in phantom lines in FIG. 3B, it steers clear of the next successive shackle B. Shackle B will thus reach the arcuate end portion 25' of the bar, as shown in FIGS. 2B and 3B, and then cock slightly and then contact the inner leg 52 of the divider guide bar 50 just downstream of apex 55. After this the wand will contact and deflect the next successive shackle C onto the outer leg 51 in commencing the next cycle of operation. In this manner the wand effectively is made to act as a gate that periodically opens and closes respectively to permit some shackles to pass freely onto one side of the guide 50 while deflecting others onto its other side.

It thus is seen that apparatus for dividing a line of poultry is now provided that operates in a simple but versatile and reliable manner. It should be understood, however, that the line divider just described in detail merely exemplifies principles of the invention in a preferred form. Many modifications may be made thereto without departure from the spirit and scope of the invention as set forth in the following claims.

I claim:

1. An apparatus for separating poultry feed in a defined forward direction along a generally predetermined line, comprising:

conveyor means for sequentially conveying, at a selected operative speed in the forward direction along said predetermined line, poultry suspended from shackles;

rotary drive means, positioned with the axis of rotation thereof substantially parallel with said predetermined line, for rotating at a rotary speed having a selected relationship with said operative speed of said conveyor means, and synchronized with said shackles conveyed thereby;

a deflector bar mounted on said rotary drive means for rotation thereby, said bar including a base portion projecting substantially away from said rotation axis, and further including an extending portion attached to said base portion and projecting substantially along said rotation axis but radially displaced therefrom, said extending portion being adequately displaced from said axis to selectively project into said predetermined line upon rotation of said rotary drive means so as to engage shackles therein and thereby deflect such selected shackles from said line;

divider guide means, situated generally along said predetermined line downstream from said rotary drive means, for guiding into one of at least two discrete paths shackles conveyed by said conveyor means, depending on whether said shackles are conveyed substantially in said predetermined line or have been deflected therefrom; wherein said rotary speed of said rotary drive means may be selected so as to controllably cause one out of a selected number of shackles to be periodically deflected from said predetermined line by said deflector bar at a point in said line upstream from said divider guide means and continuing thereto, so that poultry is separated along said line at a desired ratio.

2. The apparatus of claim 1 wherein said deflector bar is mounted on said rotary drive means for movement along a paraboloid-like path of travel.

3. The apparatus of claim 2 wherein the axis of said paraboloid-like path of travel of said deflector bar is about an axis oriented substantially parallel with said line of shackle movement.

4. The apparatus of claim 1, wherein said shackles are of the type having a center upper bar from which a pair of lower bars depend, and wherein said deflector bar is mounted on said rotary drive means for movement along a path of travel that intersects the path of movement of said shackle upper bars.

5. The apparatus of claim 4 further comprising an elongated guide bar mounted along said path of shackle movement at the height of movement of said shackle pairs of lower bars whereby said guide bar may guide said lower guide bars in leading and trailing relation along said line of shackle movement.

6. The apparatus of claim 4 wherein said divider guide means comprises a generally wedge-shaped line divider bar mounted beneath a portion of said deflector bar path of travel.

7. The apparatus of claim 1 wherein said rotary drive means is operatively coupled with said conveyor means the drive ratio of which coupling may be varied for selecting said rotary speed.

8. The apparatus of claim 7 wherein said rotary drive means comprises a gear box means driven by said conveyor means and geared to rotate said deflector bar into said path of shackle movement so as to engage and deflect each one out of every successive two shackles.

9. The apparatus of claim 6 further comprising elongated guide bar means for maintaining said shackles in a selected orientation as they approach said wedge-shaped divider guide means.

10. An apparatus for separating poultry feed in a defined forward direction along a generally predetermined line, comprising:
 conveyor means for sequentially conveying, at a selected operative speed in the forward direction along said predetermined line, poultry suspended from shackles;
 rotary drive means, having a rotational axis positioned substantially parallel with said predetermined line, and driven by a gear mechanism, operatively associated with the driving force of said conveyor means, for rotating at a rotary speed having a selected relationship with said operative speed of said conveyor means, and synchronized with said shackles conveyed thereby, such selected relationship being determined by gear ratios of such gear mechanism;
 a deflector bar mounted on said rotary drive means for rotation thereby, said bar including a base portion projecting substantially away from said rotation axis, and further including an extending portion attached to said base portion and projecting substantially along said rotation axis but radially displaced therefrom and slightly ever increasing therefrom, said extending portion being adequately displaced from said axis to selectively project into said predetermined line upon rotation of said rotary drive means so as to engage shackles therein and thereby deflect such selected shackles from said line;
 divider guide means, situated generally along said predetermined line downstream from said rotary drive means, for guiding into one of at least two discrete paths shackles conveyed by said conveyor means, depending on whether said shackles are conveyed substantially in said predetermined line or have been deflected therefrom; wherein
 said rotary speed of said rotary drive means may be selected by the substitution of gears in said gear mechanism having gear ratios such as to controllably cause one out of a selected number of shackles to be periodically deflected from said predetermined line by said deflector bar at a point in said line upstream from said divider guide means and continuing thereto, so that poultry is separated along said line at a desired ratio.

11. The apparatus of claim 10 wherein said deflector bar comprises a single-piece wand rotatable about an axis extending approximately parallel to said predetermined line, said wand having a distal end portion displaced from its axis of rotation which is movable in a circular path about such axis.

* * * * *